(12) United States Patent
Wichman et al.

(10) Patent No.: US 7,310,537 B2
(45) Date of Patent: Dec. 18, 2007

(54) COMMUNICATION ON MULTIPLE BEAMS BETWEEN STATIONS (75) Inventors: Risto Wichman, Helsinki (FI); Olav Tirkkonen, Helsinki (FI); Rinat Kashaev, Geneva (CH)

(73) Assignee: Nokia Corporation, Espoo (FI)

( * ) Notice: Subject to any disclaimer, the term of this patent is extended or adjusted under 35 U.S.C. 154(b) by 576 days.

(21) Appl. No.: 10/639,758

(22) Filed: Aug. 13, 2003

(65) Prior Publication Data

US 2004/0214606 A1  Oct. 28, 2004

(51) Int. Cl.
*H04M 1/00* (2006.01)
*H04B 17/00* (2006.01)
*H04B 1/06* (2006.01)

(52) U.S. Cl. ............... 455/562.1; 455/67.3; 455/277.1; 455/278.1

(58) Field of Classification Search ............. 455/550.1, 455/82, 557, 561, 562.1, 575.7, 403, 67.14, 455/161.3, 226.1, 67.3, 277.1, 277.2, 278.1
See application file for complete search history.

(56) References Cited

U.S. PATENT DOCUMENTS

| | | | | |
|---|---|---|---|---|
| 5,894,598 A | * | 4/1999 | Shoki ...................... | 455/562.1 |
| 6,377,636 B1 | * | 4/2002 | Paulraj et al. ............... | 375/346 |
| 6,473,467 B1 | * | 10/2002 | Wallace et al. ............. | 375/267 |
| 6,745,050 B1 | * | 6/2004 | Forsythe et al. ............ | 455/561 |
| 6,754,475 B1 | * | 6/2004 | Harrison et al. ......... | 455/115.1 |
| 6,850,741 B2 | * | 2/2005 | Lei et al. ..................... | 455/101 |
| 6,970,682 B2 | * | 11/2005 | Crilly et al. .................. | 455/78 |
| 7,020,110 B2 | * | 3/2006 | Walton et al. .............. | 370/334 |

* cited by examiner

*Primary Examiner*—Tony T. Nguyen
(74) *Attorney, Agent, or Firm*—Squire, Sanders & Dempsey L.L.P.

(57) ABSTRACT

The present invention relates to a method and a communication system wherein stations communicate on a wireless interface. The method includes the steps of including beam identity information into signals transmitted on multiple beams provided by a first station, receiving at a second station signals transmitted from the first station, and identifying beams via which the second station received signals from the first station based on said identity information. At least one beam for transmission on the wireless interface between the stations is then selected. A station configured for the communication comprises antenna means for receiving signals transmitted from the other station on multiple beams and a controller for identifying beams based on beam identity information associated with signals received from the other station.

30 Claims, 6 Drawing Sheets

| Beam identity information is included into signals transmitted in transmission beams provided by a BS |
|---|
| Signals from the BS are received at a MS |
| Beams are identified at the MS based on said beam identity information |
| A set of geometrically different beams is selected for transmission between the BS and the MS |

COMMUNICATION ON MULTIPLE BEAMS BETWEEN STATIONS

BACKGROUND OF THE INVENTION

1. Field of the Invention

The present invention relates to communication on a wireless interface between stations, and in particular, to wireless communication between stations via multiple beams. The described solution may be used, e.g., in a cellular communication system serving mobile users or any other communication system wherein information can be communicated wirelessly on multiple beams between at least two stations.

2. Background of the Invention

A wireless communication system is a facility that enables communication via a wireless interface between two or more station entities such as base stations, user equipment and/or other transmitting and/or receiving nodes. The stations are typically provided with antenna means of some kind for enabling the transmission and/or reception of signals. The communication may include, for example, communication of voice, data, multimedia and so on.

An example of the wireless communication systems is a public land mobile network (PLMN). A PLMN is typically a cellular system wherein a base transceiver station (BTS) or similar access entity serves user equipment (UE) such as mobile stations (MS) via a wireless interface between these entities. Other examples of the wireless communication systems include the wireless local area network (W-LAN) and mobile communication systems that are at least partially based on use of communication satellites. Although the W-LAN based systems typically provide smaller coverage and the satellite-based system may provide larger coverage than the PLMN systems, the basic principle is the same— information is communicated between the stations on a wireless interface.

Communication between stations can be based on appropriate communication protocols and standards. For example, the communication system may be based on use of wideband code division multiple access (WCDMA), time division multiple access (TDMA), or any other appropriate access technique. The manner the wireless interface between the stations is to be arranged is defined by appropriate standards. Examples of mobile communication standards and/or specifications include, without being limited to these, specifications such as GSM (Global System for Mobile communications), GPRS (General Packet Radio Service), EDGE (Enhanced Data rate for GSM Evolution), AMPS (American Mobile Phone System), DAMPS (Digital AMPS), or $3^{rd}$ generation (3G) communication systems such as the Universal Mobile Telecommunication System (UMTS), CDMA 2000, i-phone and so on.

Mobile communication services offered by mobile communication systems have become very popular among various types of users. Thus the quantity of user equipment has increased radically during the last few years. In addition to the conventional communication of voice (e.g. telephone calls), various data communication applications are also becoming more popular.

The increase in quantity of user equipment subscribing to a communication system and introduction of new type of services has led to capacity problems, especially during the so-called peak times. Furthermore, growing public demand for high data rate services, such as multimedia services, means that the capacity provided by conventional mobile communication systems is not always sufficient.

A proposal for increasing the capacity in wireless communication systems is to transmit information signals between base stations and user equipment in parallel via several transmit antenna elements and thus via several wireless communication channels or paths.

The multi-channel communication can be provided by means of multiple beams. The multiple beams can be provided by means of an antenna array comprising multiple antenna elements. The multiple antenna elements may be provided with adapted transmission and detection techniques. The multiple beams may be provided as so called fixed beams or by means of so called "smart antenna" arrangements. The smart antenna enables beam forming such that it is possible to form and direct the beams appropriately.

Introduction of multiple beams is believed to provide a significant increase in the spectral efficiency of wireless interfaces compared to conventional single beam antenna links.

A more specific proposal for the multi-antenna arrangements is the so called Multiple Input/Multiple Output (MIMO). The MIMO proposals promise linear increase in the link capacity. The prevailing view has been that the capacity increase is due to richness in the propagation environment, and that ideally the multiple transmit and receive antennae should be uncorrelated. Thus a MIMO system would typically have omni-directional transmit and receive antennae that are apart from each other and transmit with equal power in the whole cell or sector. Each MIMO channel includes a stationary correlation structure.

The proposed MIMO systems require computation of the so-called matrix channel between the transmitting and receiving stations. The MIMO systems may employ feedback arrangements wherein the feedback is used in the construction of optimal beams. The construction is done by decomposing each matrix channel to a set of eigenbeams.

In MIMO systems channel estimates have to be acquired for all channels. That is, when a stationary correlation structure is present in each channel, the structure of the modes to be transmitted is solved by eigenanalysis of each of the channels. To construct these matrices (i.e. the eigenbeams), relatively complex algorithms have to be used.

A further problem that may appear in the fixed multiple beam arrangements relates to selection of multiple fixed beams for the transmission. More particularly, a problem situation may be caused since a base station conventionally just measures the received power from a pilot signal transmitted by a user equipment and then chooses those fixed beams that receive the highest powers. In the fixed beam arrangements it is possible that neighbouring fixed beams are selected for a user, as these are likely to have fairly similar signal propagation conditions and thus almost equal powers. Because of this it is possible that the neighbouring fixed multiple beams are selected. The neighboring beams may interfere with each other.

Figure 5:
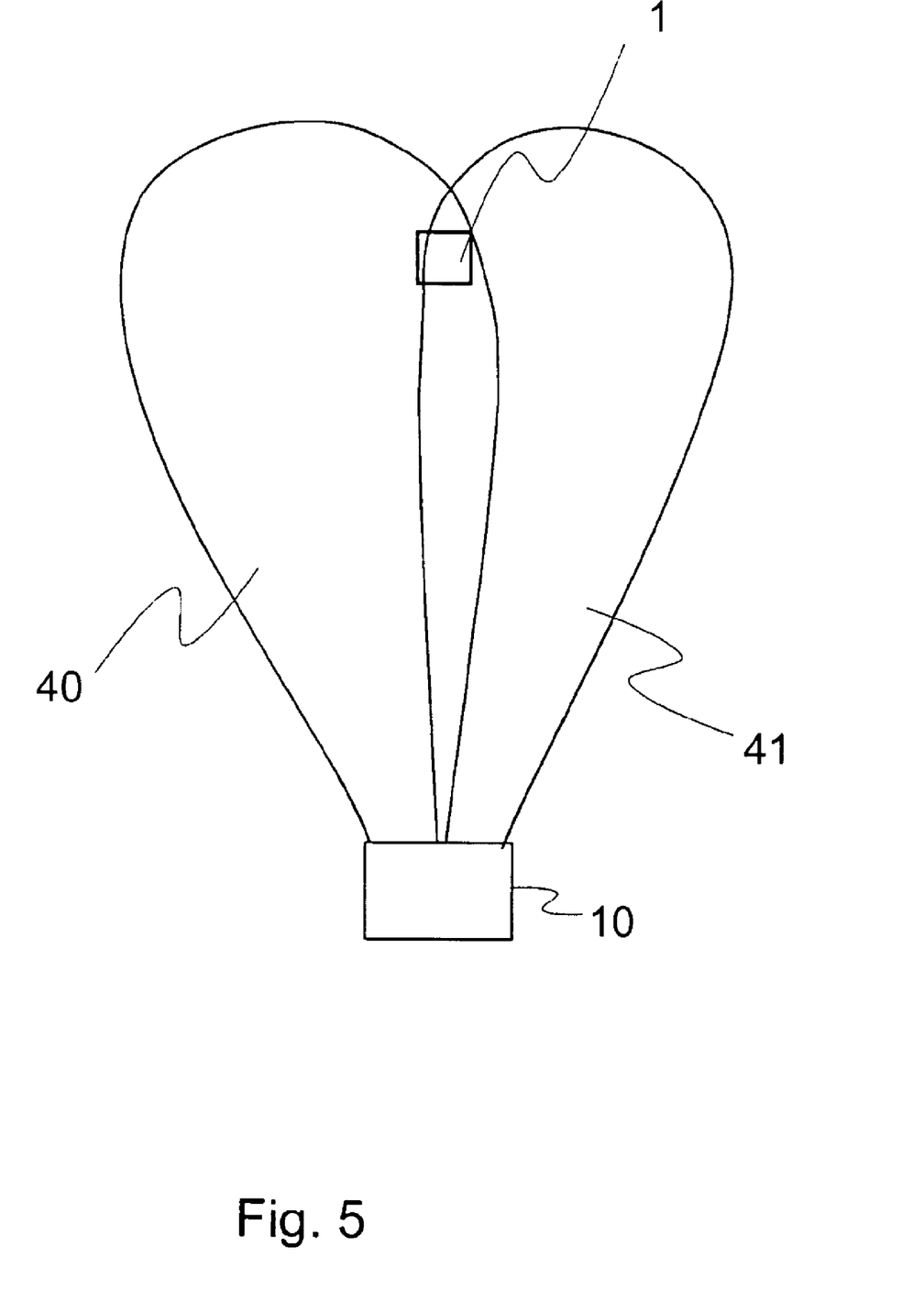
FIGS. 5, and 6 are schematic presentations of another situation wherein the invention can be advantageously employed.
Figure 6:
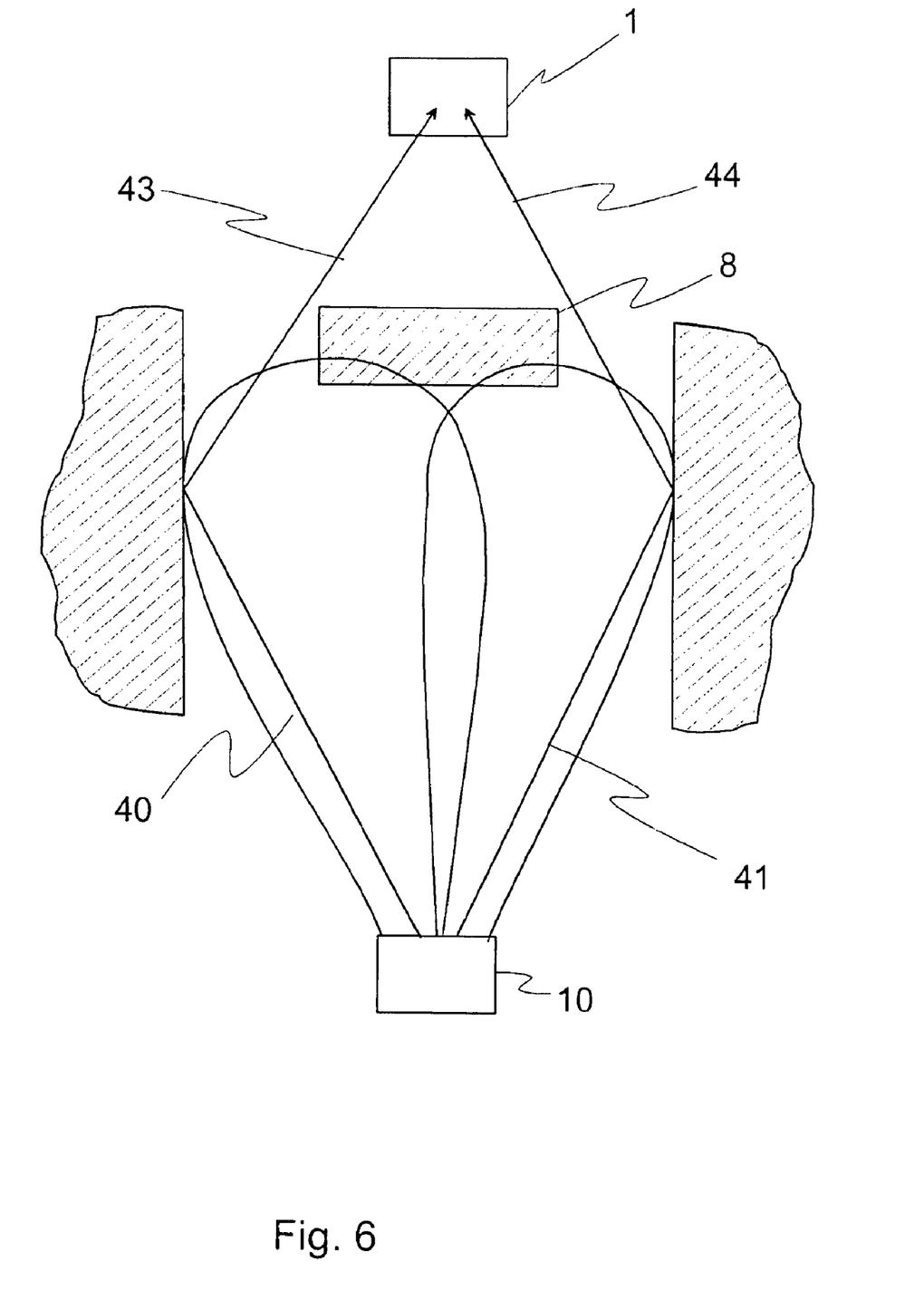

A further problem that also relates to the above discussed transmissions on neighbouring beams relates to difficulty in determining whether the signals propagate as shown in FIG. 5 or as shown in FIG. 6. As shown in FIG. 5, signals may propagate from the base station 10 to the user equipment 1 on the overlapping portions of beams 40 and 41. FIG. 6 shows another scenario wherein two signals transmitted on the adjacent beams 40 and 41 are received by the user equipment 1, the user equipment being located such that the line of sight conditions are blocked by an obstacle 8. A problem in here is that it is not possible for the base station 10 to know, based solely on power level measurements of user equipment pilot signals, whether a signal from the user equipment that has components from two adjacent fixed beams is a result of two distinct signal paths (FIG. 6) or just one signal path (FIG. 5) that arrives from direction that is between two adjacent fixed beams.

SUMMARY OF THE INVENTION

Embodiments of the present invention aim to provide a solution that addresses one or several of the above problems.

According to an embodiment of the present invention, there is provided a method in a communication system configured for communication on a wireless interface between a first station and a second station. The method includes the steps of including beam identity information into signals transmitted on multiple beams provided by the first station, receiving at the second station signals transmitted from the first station, identifying beams via which the second station received signals from the first station based on said identity information and selecting at least one beam for transmission on the wireless interface between the first and second stations.

According to another embodiment of the present invention there is provided a communication system configured for communication on a wireless interface between a first station and a second station. The communication system includes an antenna array at the first station configured to provide multiple beams, the beams being distinguishable based on beam identity information, a controller for identifying beams via which the second station received signals from the first station based on the beam identity information and means for selecting at least one beam for transmission of signals between the first and second stations based on information of the identified beams.

According to yet another embodiment of the present invention there is provided a station for communication of signals with another station via multiple beams. The station includes antenna means for receiving signals transmitted from the other station on multiple beams and a controller for identifying beams based on beam identity information associated with signals received from the other station.

In a more specific embodiment a set of geometrically distinguished beams is selected. The selection may be based on determination at the second station regarding the angle of arrival of signals. The geometrical relationships between the beams may also be determined based on the beam identity information.

The at least one beam may be selected at the second station where after the first station is informed of said selected at least one beam by sending corresponding beam identity information from the second station to the first station.

The beam identity information may be included in pilot signals sent via the beams provided by the first station.

The first station may be configured to perform adaptive beamforming.

The stations may comprise a base station of a cellular telecommunication network and a mobile station.

The embodiments of the present invention may provide advantage in that only a few channels have to be continuously estimated, thus avoiding complex analysis of each of the received channels. When setting up a connection on the wireless interface the number of signal propagation paths to be estimated can be made dependent on the used antenna array and the selected degree of separability of different directions of arrivals of the signals. The link capacity may be increased with using the existing multiple beam transmission technologies even in applications with considerable angular spread. This is enabled by the possibility of easily distinguishing between different beams having different and distinguished geometrical properties. The proposed embodiments may also reduce the size of the antenna array at the base stations. In the prior art, large arrays are needed at base stations for example in an outdoor to indoor scenario in order to have near uncorrelated channels.

BRIEF DESCRIPTION OF DRAWINGS

For better understanding of the present invention, reference will now be made by way of example to the accompanying drawings in which.

DESCRIPTION OF PREFERRED EMBODIMENTS OF THE INVENTION

Figure 1:
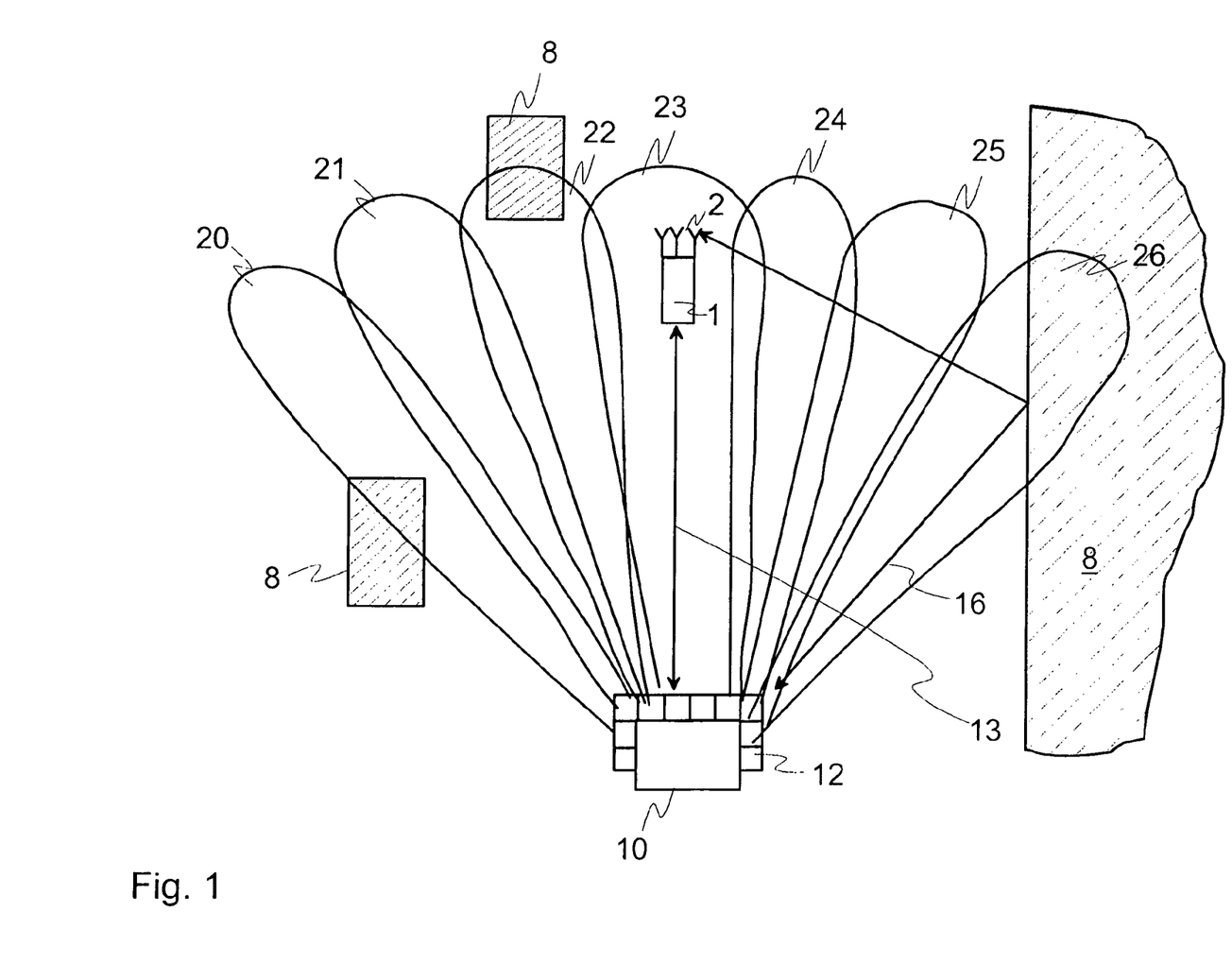
FIG. 1 shows an overview of a base station and mobile station pair provided with antenna means for multi-channel communication with each other.

Reference is made to FIG. 1, which is a simplified top view of an arrangement wherein a base station 10 of a cellular communication system serves a mobile user equipment 1. More particularly, FIG. 1 illustrates schematically the principle of provision of wireless communication on multiple beams between the base station 10 and the mobile user equipment 1. The mobile user equipment is arranged for communication with the base transceiver station 10 over the multiple beams. The mobile user equipment 1 is shown as being located within the radio coverage area of the multiple transmission beams 20 to 26 produced by the array of antenna elements 12 of the base station 10.

Figure 2:
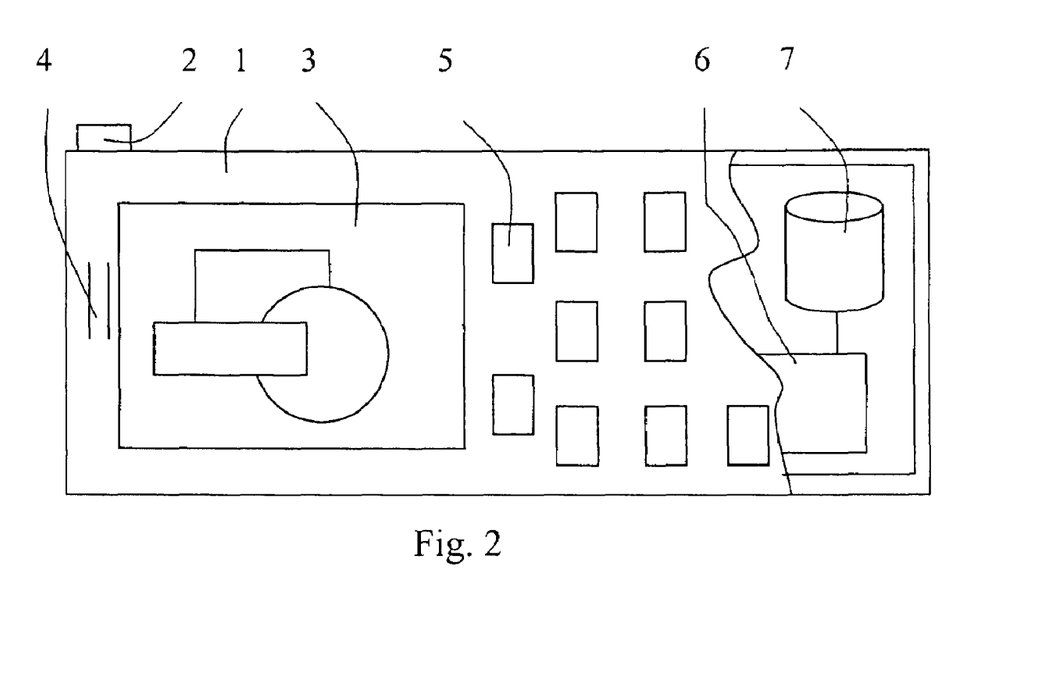
FIG. 2 shows an example of possible mobile user equipment.

FIG. 2 is a partially sectioned image of possible mobile user equipment 1. The exemplifying user equipment 1 is shown to comprise an antenna element 2 for wirelessly receiving and transmitting signals from and to base stations of a mobile communication network. The mobile user equipment 1 is also provided with a display 3 for displaying images and other visual information for the user of the mobile user equipment 1. Speaker means 4 are also shown. The operation of the mobile user equipment 1 may be controlled by means of control buttons 5 on the keypad thereof. Furthermore, the mobile user equipment 1 is provided with a processor entity 6 and a memory means 7. The processor and memory means of the user equipment may be used in the embodiments of the present invention. More particularly, the processor may be used for the required identification and selections processes.

The skilled person is familiar with the features and operation of typical mobile user equipment. Thus these do not need any further explanation. It is sufficient to note that the user may use the mobile user equipment 1 for task such as for making and receiving phone calls, for receiving content from the network and for experiencing the content presented by means of the display and/or the speaker and for interactive correspondence with another party. A feature of the mobile user equipment is that it is a station that offers mobility for the users thereof. Thus the mobile user equipment may also be referenced by the term mobile station.

The mobile station 1 and the base station 10 are shown to comprise antenna means 2 and 12, respectively, arranged for communication via multiple channels. The radio propagation paths of the various channels may be different from each other e.g. due reflections from buildings 8 or other obstacles hindering free propagation of radio signals, diffraction, polarisation or any other factor disturbing non-line of sight propagation of the radio signals between the stations. Thus the radio propagation paths may have different geometries at the time they are received by the mobile station as the signals transmitted on the beams may travel geometrically different paths.

In FIG. 1 the mobile station 1 is shown to receive signals that are transmitted on beams 23 and 26 from the base station 10. Beam 23 offers line-of-sight conditions, and hence the signals may propagate the linear path 13. However, signals received from beam 26 are reflected from building 8. The path of travel of the reflected signals is shown by the line 16.

In the embodiments discussed herein, the multiple beams are distinguished from each other based on beam identity information. The beam identity information is preferably included in the pilot signals transmitted on the beams provided by the base station 10. The receiving station may then select and identify at least two geometrically different beams based on said identity information on the pilots.

Figure 3:
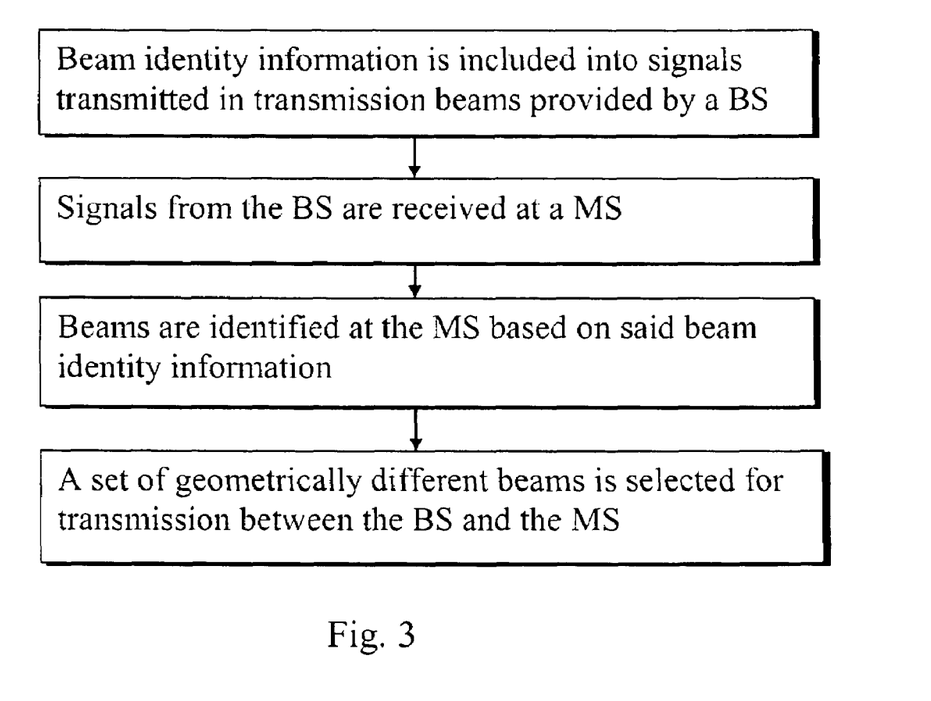
FIG. 3 shows a flowchart for operation in a communication system configured in accordance with FIG. 1.

The flowchart of FIG. 3 illustrates the operation in accordance with the FIG. 1 embodiment. In the shown embodiment geometrically distinct wireless paths are distinguished from each other based on beam identity information included into the signals on each transmission beam. The mobile station may select an appropriate set of beams for further transmissions and inform the base station about the selection by returning the beam identity information of the selected beams. The subsequent transmissions between the stations then occur on the selected geometrically different beams.

The selection of an appropriate set of beams may be based on the realisation that the long term structure of a beam is based on geometrically distinct radio propagation path of signal on that beam. For example, in an urban base station which is capable of directing beams above and below the roof level, completely different signal propagation paths may be constructed in these two different beams. Similarly, in FIG. 1 signals 13 and 16 on beams 23 and 26, respectively, travel in geometrically distinguished propagation environments. These different beams are referenced in this document as geometrically different or distinguished beams.

Selection of beams based on geometry may be used to simplify the process of finding multiple beams to transmit to. The selected channels can be identified at the receiving station based on the beam identity information included in the signals transmitted on the beam. The information may be included for example as a pilot bit sequence in a pilot signal.

In addition to information about the beam identities, the mobile station 1 may base its selection on further information such as the angle of arrival of the signal. Having determined that the received signals arrive from the same source, and that they are geometrically different enough the mobile station may select two or more such geometrically different channels for further communication. For example, the mobile station 1 may determine that the signals arrive from different angles or that there is a difference in the delay between the transmission and reception of the signals. The base station 10 may also inform the mobile station 1 that the cell has n beams, n being any appropriate integer.

Accordingly, the base station 10 informs the mobile station that beams 20 and 26 are directed in substantially normal to each other while all other beams are located between the beams 20 and 26, in ascending or descending or any other predefined order. The mobile station 1 may then determine that for example beams 23 and 24 are adjacent to each other, and only one of them should be selected. It is also possible to standardise the order of the identities in a set of beams. The base station 10 would then not necessarily need to provide the mobile station with such information, but the mobile station 1 would automatically understand the geometrical relationships between differently identified beams. In this embodiment the mobile station 1 may not need to determine the angles at which the signals arrive.

In addition, for receiving signals from base station 10 on the at least two selected geometrically distinct beams 23 and 26, the mobile station 1 may use the selected set of beams for transmission towards the base station. For example, the mobile station 1 may use the selected beams to inform the base station 10 of the selection and for any subsequent communication. Upon receipt of the notification of the selected beam identities, the base station 10 may then use these beams only for transmission towards the mobile station, and use the other beams for communication with other stations.

The following will describe more detailed examples of possible embodiments. It shall be appreciated that although the specific description concentrates mainly on downlink operation, similar principles apply to uplink, i.e. from the mobile station to base station.

The first example relates to fixed beam arrangements for multiple transmissions. The fixed beams may be used by the base station 10, the mobile station 1 or both. In this specific embodiment the base station 10 transmits pilot symbol sequences to a fixed set of beams 20 to 26 using a set of auto channel transmission resources. These transmissions may be broadcast to all users during the operation of dedicated wireless channels. For example, a 3GPP WCDMA base station may transmit with fixed beams such that a secondary pilot signal with different spreading codes to different beams is transmitted.

The mobile station 1 receiving the transmission may be provided with multiple antenna elements 2. The antenna elements are preferably in a calibrated array. In an environment with large annular spread more than one of the base station beams typically reaches the mobile station 1 with a considerable power. Upon detection of the pilot signals the mobile station 1 measures the direction of arrival and the power of each of the pilot signals transmitted by the base station 10 to the fixed beams. The mobile station 1 may then select an appropriate set of beams and transmit the identities of these beams in a connection request. The base station will then provide the connection via the selected beams. The beams are identified by the base station 10 based on the beam identifiers. It is not necessary to use any other estimations for the selection of the beams at the base station end.

The second example relates to use of multiple antenna elements and transceivers in an array of correlated antennae. That is, the base station is equipped with an antenna array capable of adaptive beam forming instead of providing fixed beams. This type of antenna array is sometimes referenced to by the term 'smart antenna'.

Figure 4:
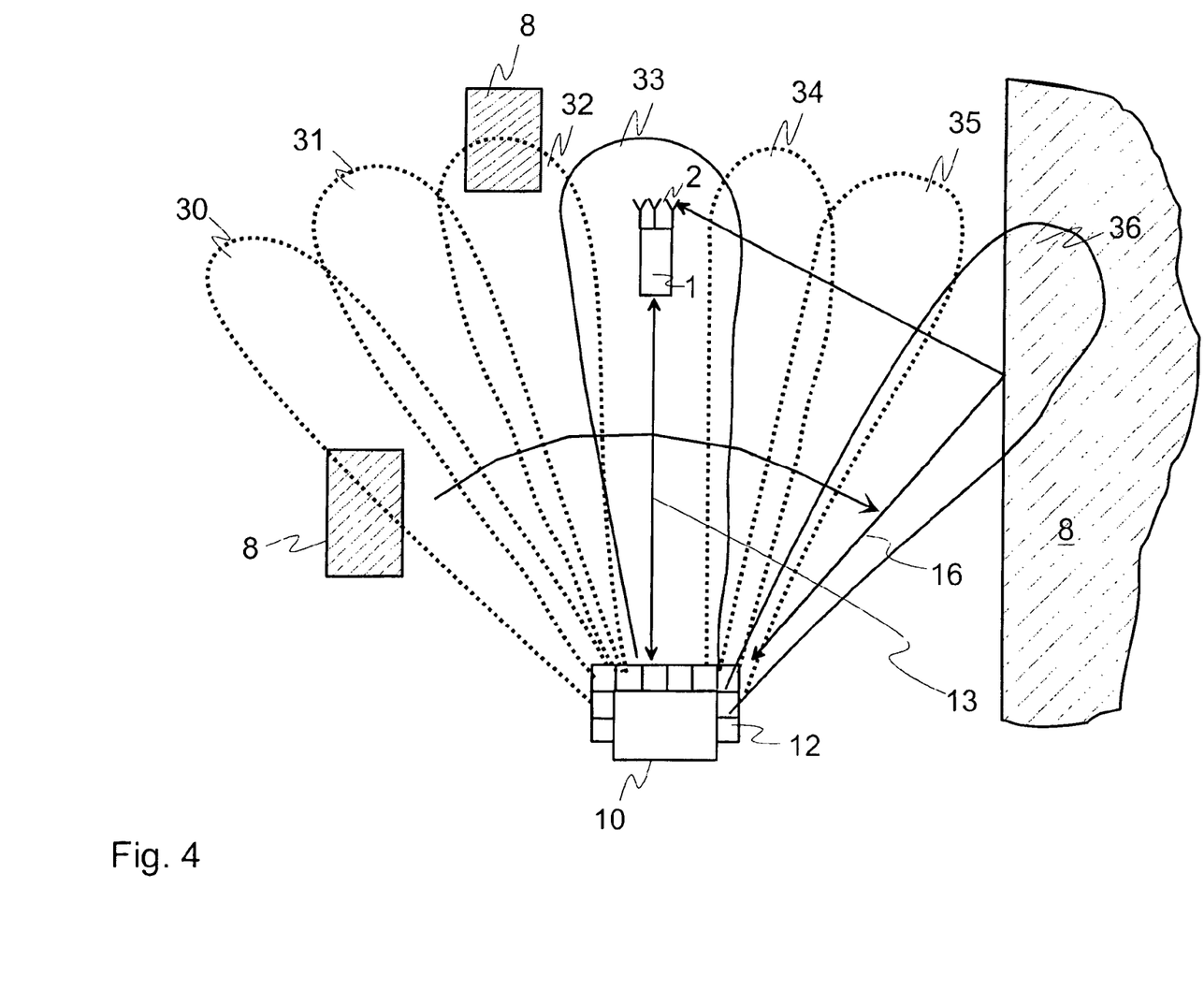
FIG. 4 shows another embodiment.

A possible operation of a smart antenna array is illustrated in FIG. 4. As shown, the transmitting station 10 is configure to provide a beam that is moved from a location to another between locations 30 to 36. In each location a pilot signal is transmitted. A different beam identity may be included in each of the pilots. The mobile station 1 may then select appropriate beams (i.e. locations) via which it wants to receive from the base station. In FIG. 4 the mobile station 1 has selected beams at locations 33 and 36 for the further transmissions from the base station 10.

In accordance with a possibility the beams may be identified based on information regarding the time of transmission of the pilot. That is, the identities of the beams in various locations may be time differentiated. The identity may comprise, for example, the time of transmission of the pilot. The timing information can be included in the pilot by the base station.

In environments with small angular spread, signal processing techniques based on directions of arrival (DOA) and directions of transmission (DOT) can be effectively used to target the transmit power onto the other station of choice in a focused set beam. From a system capacity point of view, beam forming with smart antennae is effective, especially as the intracell interface can be minimized. Thus the use of smart antenna arrays or similar at one of the stations may reduce interference.

In the cellular systems the smart antenna is preferably provided at the base station. However, the mobile station may also be provided with a smart antenna. It shall be appreciated that a smart antenna is capable of producing a set of fixed beams, such as the set shown in FIG. 1.

The selection of beams may also be accomplished at the base station 10. For example, the base station 10 may select beams for receiving signals from the mobile station 1. In this case, after a connection request, the mobile station antenna array 12 may send signal sequences of pilot bits to a quantified set of fixed beams with directions of transmissions using a set of enumerated orthogonal transmission resources. These resources may be, for example, different time epochs, different spreading codes, different frequencies and so on. The number of the user equipment trial beams may be fixed, the number may change from cell to cell or the user equipment may select a suitable number of trial beams and inform the base station of the selection as a part of the connection request.

At least some of the beams may overlap. Thus, and as shown in FIGS. 5 and 6, the mobile station 1 may listen adjacent beams from the base station 10 at the same time. As discussed above, the overlapping multiple beams may present problems, for example because of neighboring channel interference. Furthermore, it may not be possible to determine whether a signal is transmitted on the two adjacent beams 40 and 41, or if two different signals are transmitted on the beams 40 and 41.

Figure 7:
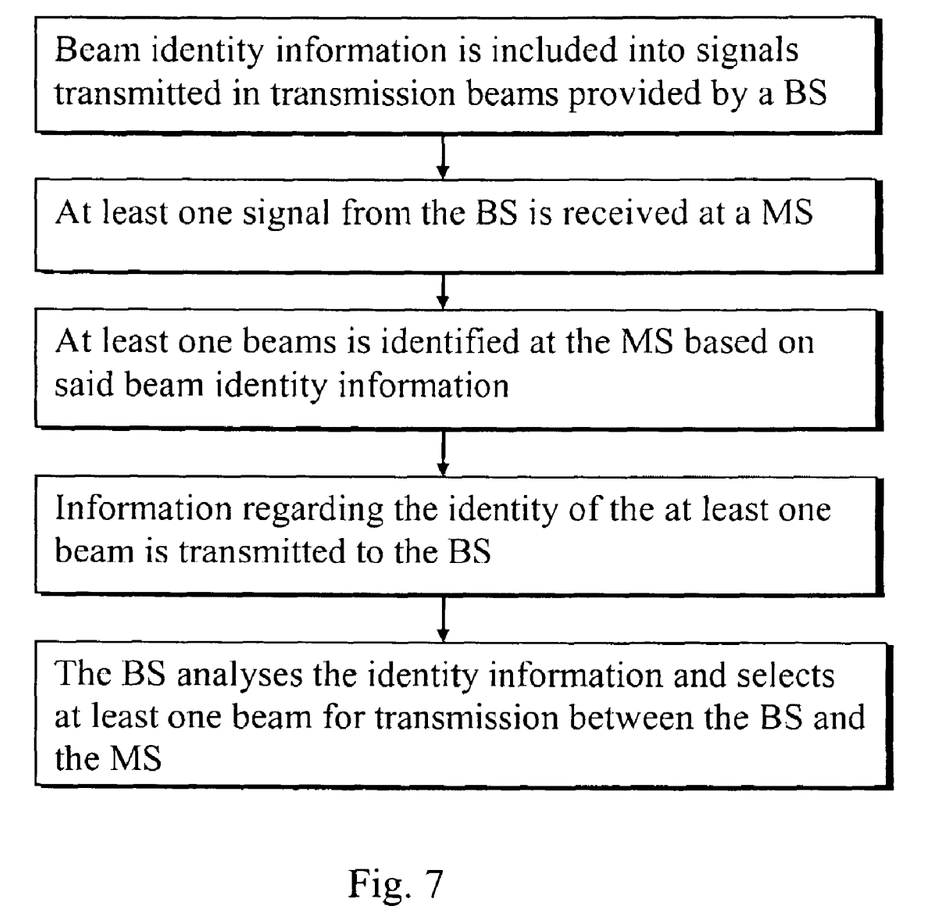
FIG. 7 is a flowchart associated with FIGS. 5 and 6.

The embodiments of the present invention may be used to solve or at least to mitigate problems caused by overlapping or otherwise "too close" beams. Operation in accordance with an embodiment wherein the beam identity information is utilised in this manner is shown in the flowchart of FIG. 7.

The mobile station 1 may determine, based on the beam identity information, the identities of beams it receives from the base station 10. The mobile station 1 may then insert the identity information into a connection request. If the signal travels on overlapping portions of beams 40 and 41, the base station 10 may use the beam identity information included in connection request from the mobile station 1 to determine whether the mobile station 1 received the signals in conditions as shown in FIG. 5 or as shown in FIG. 6.

The base station 10 may use the identity information in determining why the request from the mobile station 1 includes components from two adjacent fixed beams. If only one identity is returned by the mobile station 1, the base station 10 may conclude that only one pilot signal arrives the mobile station and that the pilot arrives from a direction that is between two adjacent fixed beams 40 and 41. The base station 10 may in such case select the beam whose identity was returned and choose not to send signals relating to the same transmission on the adjacent beams. It is also possible for the base station 10 to combine the beams 40 and 41 and transmit on the combined beam to the mobile station 1.

If two identities are returned by the mobile station 1, it can be concluded that the pilot signal has travelled on two geometrically distinct signal paths. For example, see signals 43 and 44 of FIG. 6. The base station 10 may then need to select one of these. The base station may also decide to use both beams for transmission of data to the mobile station. In the layer case the data to be transmitted in the neighbouring beams is preferably independent from each other.

It shall be appreciated that there may be occasions where the selected set of beams have of only one beam. In addition to the above example wherein one of neighboring beams was selected, it may be that only one beam is available or possible. Thus, instead of selecting at least two beams, the base station may decide to select only one beam for transmission to the mobile station. This may be needed, for example, in circumstances wherein the mobile station returns identities of beams that would not be suitable for simultaneous transmission of related data to the mobile station.

The beam selection may be tracked with signal processing means of the receiving station during the transmission. That is, the receiving station may dynamically change the selection by sending back information regarding the identities of the desired beams.

The selection of an appropriate set of wireless communication channels can be repeated e.g. with specified intervals, upon request, or in response to a specific event. For example, the selection may need to be updated in response to the mobile station having moved such that the previous set may no longer be used to provide an appropriate level of service. New obstacles may also move into the cell such that the signal propagation paths are altered.

In a preferred communication arrangement the multi-antenna transmission is provided based on the Multiple Input/Multiple Output (MIMO) specifications. The embodiments of the present invention may be used adaptively and dynamically with any of the MIMO receiver algorithms.

Any further appropriate criteria may also be used for the selection of beams. For example, the user may have subscribed to a service with certain quality of service (QoS). The selection of the beams is then accomplished so as to meet the service level. Different subscribers may have different quality of service requirements, and the communication system may optimize the use of the multiple beams so as to serve all users in accordance with the respective service levels.

It shall also be appreciated that although the above described a radio interface between a base station and a mobile station, the principles of the invention can be applied to any multiple beam communication arrangement comprising two stations. Furthermore, if applied to a base station—mobile station radio interface, the invention may be used for the downlink and/or uplink. The principles may also be applied to wireless links between fixed stations. Although the propagation environments for the fixed links can be seen as fairly stabile, and thus the once selected beams may be used for long periods of time, the system may need to be provided with a capability of adapting to changes. For example, the signal propagation geometries may change because of obstacles moving between the stations. Capacity or interference reasons may also require selection of a new set of beams.

It shall also be appreciated that it is not necessary to assign an identity for each of the beams. For example, only selected beams such as every second beam could be assigned with an identity.

Selection of beams such that beam identity information is used may be made an optional feature. For example, the user of the mobile station or the operator of the cellular system may decide that another method of beam selection or no selection is to be used. Thus the beam selection function as described above may be arranged to be such that it can be activated/deactivated (switched on/off) as appropriate.

The proposed method to distinguish the geometrically distinct signal paths is believed to work irrespective of a possible signal path delay.

It should be appreciated that one cell may include more than one base station site or that a base station apparatus or site may also provide more than one cell. The shape and size of the cells depend on the implementation and may be different from the illustrated shapes. The shape and size of the cells may also vary from cell to cell.

It shall also be appreciated that the antenna means adapted for multi-beam communication may comprise any appropriate means for reception and/or transmission of signals. For example, instead of using separate antenna components, the antenna means may be integrated with any of the components of the base station and/or the mobile station, such as the cover or an internal component thereof.

It is also noted herein that while the above describes exemplifying embodiments of the invention, there are several variations and modifications which may be made to the disclosed solution without departing from the scope of the present invention as defined in the appended claims.

The invention claimed is:

1. A method, comprising:
including beam identity information into signals transmitted on multiple beams provided by a first station, the method being performed in a communication system configured for communication on a wireless interface between the first station and a second station;
receiving at the second station signals transmitted from the first station;
identifying beams via which the second station received signals from the first station based on said identity information; and
selecting at least one beam for transmission on the wireless interface between the first and second stations,
wherein selecting at least one beam comprises selecting a set of beams that are geometrically distinguished from each other.

2. The method as claimed in claim 1, further comprising determining an angle of arrival of signals at the second station.

3. The method as claimed in claim 1, comprising selecting the at least one beam at the second station and informing the first station of said selected at least one beam by sending corresponding beam identity information from the second station to the first station.

4. The method as claimed in claim 1, further comprising sending the beam identity information in a sequence of information bits.

5. The method as claimed in claim 1, wherein the beam identity information is included in pilot signals sent via the beams provided by the first station.

6. The method as claimed in claim 1, further comprising performing adaptive beamforming at the first station.

7. The method as claimed in claim 6, comprising identifying the beams based on a time of transmission of the signals on the beams.

8. The method as claimed in claim 1, wherein the first station comprises a base station of a cellular telecommunication network and the second station comprises a mobile station.

9. The method as claimed in claim 1, wherein the second station comprises a base station of a cellular telecommunication network and the first station comprises a mobile station.

10. The method as claimed in claim 1, comprising selecting beams for transmission at the first station.

11. The method as claimed in claim 1, comprising determining geometrical relationships between the beams based on the beam identity information.

12. The method as claimed in claim 1, comprising transmitting a connection request from the second station to the first station via the selected beams.

13. The method as claimed in claim 1, comprising selecting one of neighboring beams based on the beam identity information.

14. The method as claimed in claim 13, comprising selecting neighboring beams based on the beam identity information and transmitting unrelated information on the selected neighboring beams.

15. The method as claimed in claim 1, comprising dynamically selecting an appropriate set of beams.

16. The method as claimed in claim 1, comprising using at least one additional criterion in the selection of the beams.

17. The method as claimed in claim 16, wherein an additional criterion comprises quality of service.

18. The method as claimed in claims 1, wherein the multiple beams are provided based on a Multiple Input/Multiple Output arrangement.

19. The method as claimed in claim 18, wherein the beams selection is used adaptively with at least one Multiple Input/Multiple Output algorithm.

20. A communication system, comprising:
an antenna array at a first station configured to provide multiple beams, the beams being distinguishable based on beam identity information, the communication system being configured for communication on a wireless interface between the first station and a second station;
a controller for identifying beams via which the second station received signals from the first station based on the beam identity information; and
a selecting unit configured to select at least one beam for transmission of signals between the first and second stations based on information of the identified beams,
wherein selecting at least one beam comprises selecting a set of beams that are geometrically distinguished from each other.

21. The communication system as claimed in claim 20, wherein the selecting unit is configured to select a set of geometrically distinguished beams.

22. The communication system as claimed in claim 20, wherein the selecting unit is provided in the second station.

23. The communication system as claimed in claim 20, wherein the, wherein the selecting unit is provided in the first station.

24. The communication system as claimed in claim 20, wherein the antenna array is configured for adaptive beamforming.

25. The communication system as claimed in claim 20, wherein one of the stations of the first station and the second station comprises a base station of a cellular telecommunication network and another station of the first station and the second station comprises a mobile station.

26. A station, comprising:
  antenna unit configured to receive signals transmitted from another station on multiple beams; and
  a controller for identifying beams based on beam identity information associated with signals received from the other station,
  wherein a set of beams that are geometrically distinguished from each other is selected for transmission of signals between a first station and a second station based on information of the identified beams.

27. The station as claimed in claim 26, further comprising a unit for selecting a set of geometrically distinguished beams.

28. The station as claimed in claim 26, comprising a mobile station.

29. An apparatus, comprising:
  an antenna array at a first station configured to provide multiple beams, the beams being distinguishable based on beam identity information, the communication system being configured for communication on a wireless interface between the first station and a second station;
  a controller for identifying beams via which the second station received signals from the first station based on the beam identity information; and
  a selecting means for selecting at least one beam for transmission of signals between the first and second stations based on information of the identified beams,
  wherein selecting at least one beam comprises selecting a set of beams that are geometrically distinguished from each other.

30. A station, comprising:
  antenna means for receiving signals transmitted from another station on multiple beams; and
  a controller for identifying beams based on beam identity information associated with signals received from the other station
  wherein a set of beams that are geometrically distinguished from each other is selected for transmission of signals between a first station and a second station based on information of the identified beams.

* * * * *